Patented Aug. 13, 1929.

1,724,558

UNITED STATES PATENT OFFICE.

GEORGE B. BURNHAM, OF RENO, NEVADA, ASSIGNOR TO BURNHAM CHEMICAL COMPANY, OF RENO, NEVADA, A CORPORATION OF NEVADA.

PROCESS FOR CRYSTALLIZING SALTS FROM BRINE.

No Drawing.    Application filed November 16, 1925.   Serial No. 69,274.

My invention relates to processes for obtaining salt from brines containing the same, and especially to a process in which the brine is heated above its temperature of maximum solubility of the salt to cause crystallization of the contained salt.

An object of my invention is to provide a process for obtaining a salt from brine by heating the brine by solar influence.

Another object of my invention is to obtain sodium carbonate sulphate from brine containing it by solar heating of the brine above the temperature of maximum solubility of the salt in the brine.

A further object of my invention is to provide a method of maintaining a superficial salt crust over a shallow pond of brine being heated by solar action.

The invention possesses other advantageous features, some of which with the foregoing, will be set forth at length in the following description where I shall outline in full the preferred form of the process of my invention.

Broadly speaking, the process of my invention comprises heating brine containing a salt above the temperature of maximum solubility of the salt by solar means.

I shall describe the process of my invention as I practice it in connection with the brine of Searles Lake, California, but the process is applicable to any comparable saline liquor. Searles Lake brine is a subterranean liquor containing various salts and in this instance I shall outline the method of obtaining the double salt, sodium carbonate sulphate.

The saline liquor is pumped from its subterranean position and is discharged into a large deep pond in which it is exposed to the action of the sun and wind. As described in my co-pending application, and entitled "Process for evaporating and cooling brine", Serial No. 69,272, filed November 16, 1925, the liquid in the large deep pond is subject to a great amount of wave action which aids in making the rate of evaporation relatively high. When the brine has been brought approximately to the point of saturation with sodium carbonate sulphate, it is pumped or flowed by gravity from the large pond into a shallow pond, usually about 3 inches deep.

In the shallow pond, the wave action is very slight, and the action of the sun evaporates the liquid until crystals of the salt unite on the surface of the pond to form a superficial salt crust. The crystals start to form a crust from any solid substance in contact with the surface of the pond, and to aid in starting the crust and to keep it intact after it is once formed, I provide supports. Usually stakes are driven into the bottom of the pond at intervals of from 10 to 15 feet. Mounds of crystallized salt or clay will serve equally well to start the formation of the crust and to support it after it is once formed.

The presence of the superficial crust, which is thin and transparent, very effectually prevents further evaporation of the liquid, so that the heat of the sun is communicated to the liquid but is not lost in vaporization. It is possible on a warm day to raise the temperature of the brine by this method as high as 60 degrees centigrade.

The maximum solubility of sodium carbonate sulphate in Searles Lake brine occurs at approximately 30 to 35 degress centigrade. Since the brine has been nearly saturated with that salt by exposure in the large deep pond, crystallization of sodium carbonate sulphate readily occurs when the brine beneath the salt crust is heated to 60 degrees centigrade.

It is to be understood that the temperatures given are only approximate since the particular day and time of day effects the amount of solar heat available, but the process is very effective when carried out by means of the normal summer sun.

The brine is allowed to remain in the shallow pond until it has reached the desired temperature, after which it is withdrawn. A satisfactory procedure is to introduce the brine into the pond and withdraw it at substantially the same rate. By so doing the salt crust can be kept intact and the rate of flow of the liquid can be such that the brine will receive the proper amount of heat. If the salt crust should break in places, it will quickly form again, growing out from the remaining crust or reforming from the edge of the pond or from a stake.

When the sodium carbonate sulphate has crystallized, it may be obtained from the brine in any of the well-known ways.

I claim:

1. The process of heating brine which comprises flowing the brine beneath a salt crust subject to the action of the sun.

2. The process of heating brine which comprises exposing the brine in a shallow pond to the action of the sun whereby a salt crust is formed which prevents further evaporation, removing treated brine from beneath said crust, and flowing additional brine under the salt crust.

3. The process of heating brine which comprises exposing the brine in a shallow pond to the action of the sun whereby a salt crust is formed, supporting the salt crust, removing treated brine from beneath said crust, and flowing additional brine under the salt crust.

4. The process of forming a salt crust which comprises exposing brine to the action of the sun and wind, said brine being in a shallow pond having supports at intervals therein for supporting said salt crust.

5. The process of heating brine which comprises flowing the brine into a shallow pond, allowing a superficial salt crust to form on said brine, supporting said crust, and withdrawing the brine from under said crust.

6. The process of obtaining a salt from brine containing the salt which comprises heating the brine above the temperature of maximum solubility of the salt by flowing the brine below a crust of salt exposed to the action of the sun.

7. The process of obtaining a salt from brine containing the salt which comprises evaporating the brine in a deep pond, flowing the brine from the pond into a shallow pond in which a superficial salt crust forms, and withdrawing the brine from the shallow pond at substantially the same rate at which it is introduced.

8. The process of obtaining sodium carbonate sulphate from brine containing the same which comprises evaporating the brine in a deep pond, flowing the brine from the deep pond into a shallow pond in which a superficial salt crust forms, supporting said crust, heating the brine in said pond by solar action to a temperature above 35 degrees centigrade, withdrawing said brine at substantially the rate at which it is introduced, and recovering the crystallized sodium carbonate sulphate.

In testimony whereof, I have hereunto set my hand.

GEORGE B. BURNHAM.